(12) United States Patent
Barnard et al.

(10) Patent No.: US 7,866,600 B2
(45) Date of Patent: Jan. 11, 2011

(54) INTEGRATED ENGINE AIR PARTICLE FILTER ASSEMBLY

(75) Inventors: Richard S. Barnard, Monroe, CT (US); Jon C. Peters, Oxford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 446 days.

(21) Appl. No.: 11/911,365

(22) PCT Filed: Apr. 13, 2006

(86) PCT No.: PCT/US2006/013976
§ 371 (c)(1), (2), (4) Date: Oct. 12, 2007

(87) PCT Pub. No.: WO2006/113388
PCT Pub. Date: Oct. 26, 2006

(65) Prior Publication Data
US 2008/0173276 A1    Jul. 24, 2008

(51) Int. Cl.
*B64B 1/24* (2006.01)

(52) U.S. Cl. .................... 244/53 B; 60/39.092; 96/376; 415/121.2

(58) Field of Classification Search ............. 244/17.11, 244/53 B, 53 R; 60/39.092; 96/36; 415/121.2
See application file for complete search history.

(56) References Cited

U.S. PATENT DOCUMENTS

| | | | |
|---|---|---|---|
| 3,483,676 A | 12/1969 | Sargisson | |
| 4,537,608 A * | 8/1985 | Koslow | 55/337 |
| 5,472,463 A * | 12/1995 | Herman et al. | 55/319 |
| 6,595,742 B2 * | 7/2003 | Scimone | 415/121.2 |
| 7,491,253 B2 * | 2/2009 | Wilson | 55/306 |
| 2002/0182062 A1 | 12/2002 | Scimone | |

OTHER PUBLICATIONS

International Search Report for PCT/US2006/013976, May 3, 2007.

\* cited by examiner

*Primary Examiner*—J. Woodrow Eldred
(74) *Attorney, Agent, or Firm*—Carlson Gaskey & Olds, PC

(57) ABSTRACT

An engine air particle filter system configured to selectively receive one of at least a first tray which supports a first filter media and a second tray which supports a second filter media different than the first filter media.

26 Claims, 6 Drawing Sheets

INTEGRATED ENGINE AIR PARTICLE FILTER ASSEMBLY

BACKGROUND OF THE INVENTION

1. Field of the Invention

The present invention is related to an engine air particle separator and filter assembly.

2. Description of Related Art

Rotary-wing aircraft often operate utilizing various types of combustion engines. Inherent in the operation of these engines is that air continuously flows through an intake on the outer periphery of the rotary-wing aircraft and into the engine. The air will then mix with the fuel resulting in a mixture of fuel to air that has optimum ratios. The fuel/air mixture is then subjected to a spark and the mixture is ignited. The resulting explosion provides the force that is necessary to drive the various engine components.

Rotary-wing aircraft operate in a variety of environmental conditions. The various conditions result in air that contains impurities of various sizes and composition. For example, the air in an urban environment may contain impurities of relatively larger sizes, such as leaves, while the air in a desert may contain impurities of relatively smaller sizes, such as grains of sand. In addition, rotary-wing aircraft operate in a variety of temperatures depending on the time of year and geographical location. In very cold temperatures, freezing of the engine components may occur unless preventative action is taken.

Currently, engine air particle separators (EAPS) and barrier filter systems are used to filter the air prior to entering the rotary-wing aircraft's engine. The environmental conditions in which the rotary-wing aircraft often determines whether EAPS or barrier filters will be used. For example, EAPS may be more suitable to use when the air contains impurities of relatively larger sizes or in freezing temperatures. On the other hand, barrier filter technology may prove to be more suitable in desert-like environments where the air contains impurities of relatively smaller sizes, e.g., grains of sand.

As shown in FIG. 2, currently available EAPS include a plurality of individual centrifugal separator swirl tubes which are located in two panels. In use, engine air particle separators (EAPS) are sized and configured to be mounted ahead of the engine inlet ducts and are designed to reduce the erosion of the aircraft engines due to sand and dust ingestion. Moreover, EAPS are configured to discharge dirty air overboard through a scavenge system powered by an electric blower while allowing cleaned air to enter the engine inlet.

Additionally, EAPS require virtually no cleaning since there is not a buildup of filtered impurities in the unit. Thus, the engine power penalty remains substantially constant with time. In addition, EAPS have been shown to operate successfully in some icing conditions. Thus, not only do the EAPS operate as a particle separator, but it also provides a level of ice protection for the engine as well. The level of ice protection depends upon the orientation of the swirl tubes to the free stream airflow. Prior to the development of EAPS, the inlet ducts, as shown in FIG. 3, were equipped with integral electric heating elements to prevent the formation of ice on the engine. In using EAPS, the integral electric heating elements can either be disabled or removed.

Field experience has shown that EAPS may provide inadequate particle separation efficiency in severe sand and dust operational environments. This is mainly due to the relatively low efficiency of the swirl tubes to remove very fine particles from the inlet air stream. As a result, an unacceptable level of engine erosion protection may result.

In environments such as these, vehicles are often equipped with barrier filters. Barrier filter technology, in contrast with EAPS technology, has been shown to provide satisfactory engine erosion protection in sandy and dusty environments. Barrier filters are capable of separating approximately 99% of very fine particles. The particles that are filtered from the air are retained in the filter. As the sand and dust accumulates in the filter, power of the engine is compromised resulting in decreased performance of the aircraft. Consequently, the filters require servicing at regular intervals in order to remove the dirt and dust.

Currently there is no quick and inexpensive way to switch from the use of an EAPS with vortex tube technology and to an assembly using barrier filter panels. Currently, such a change requires the filter system as a whole must be removed from the rotary-wing aircraft and replaced with another filter system. The capability to quickly and inexpensively change between vortex tubes and barrier filter panels would be beneficial to the owner of the aircraft.

BRIEF SUMMARY OF THE INVENTION

An engine air particle filter system according to an exemplary aspect of the present invention includes a support structure which defines a multiple of openings, each of the multiple of openings configured to selectively receive one of at least a first tray which supports a first filter media and a second tray which supports a second filter media different than the first filter media.

The above-described and other features and advantages of the present invention will be appreciated and understood by those skilled in the art from the following detailed description, drawings, and appended claims.

DETAILED DESCRIPTION OF THE INVENTION

Figure 1:
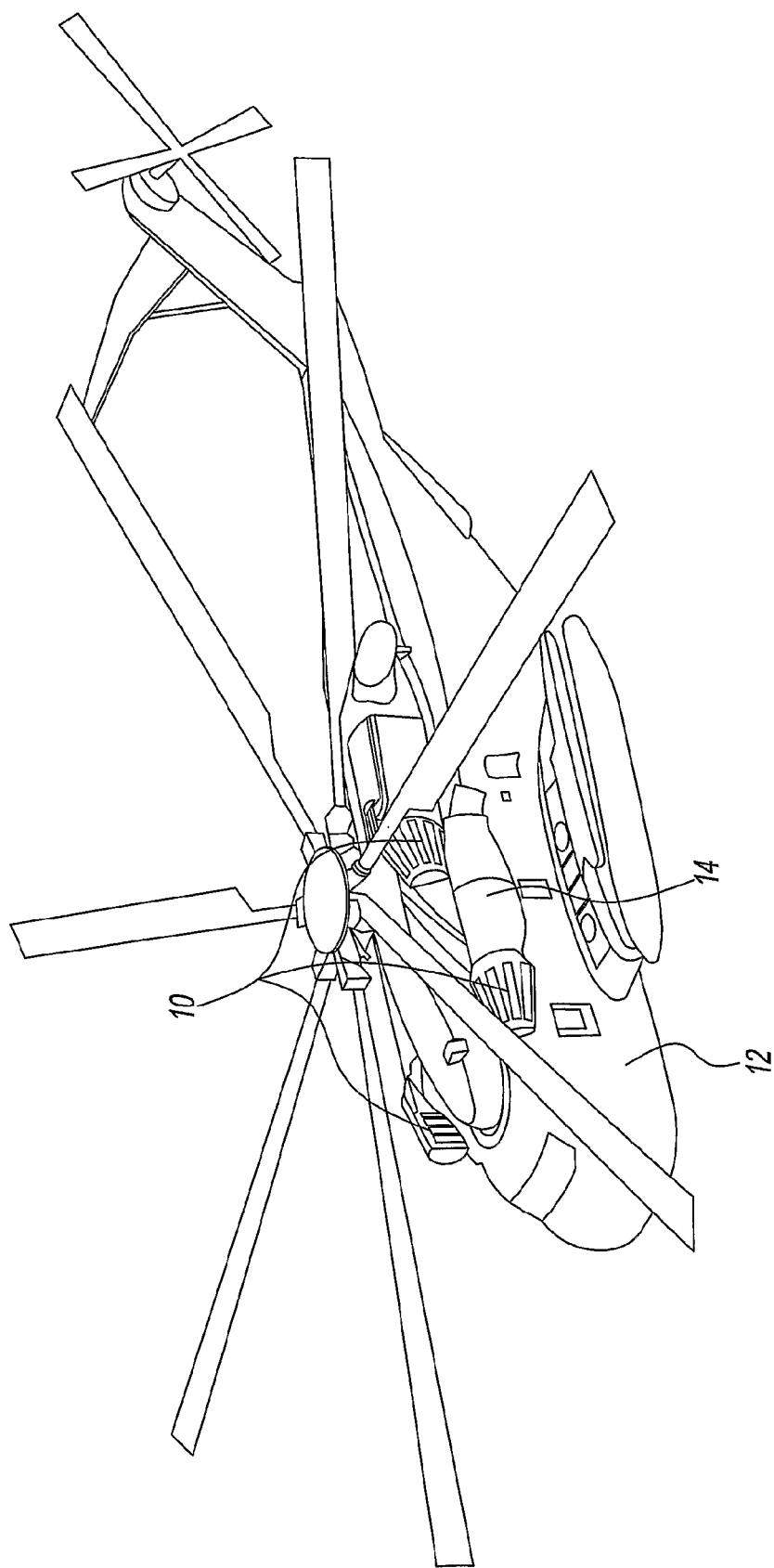
FIG. 1 is a top perspective view of a rotary-wing aircraft having an exemplary non-limiting embodiment of an engine air particle separator (EAPS) according to the present disclosure in use on a rotary-wing aircraft.
Figure 2:
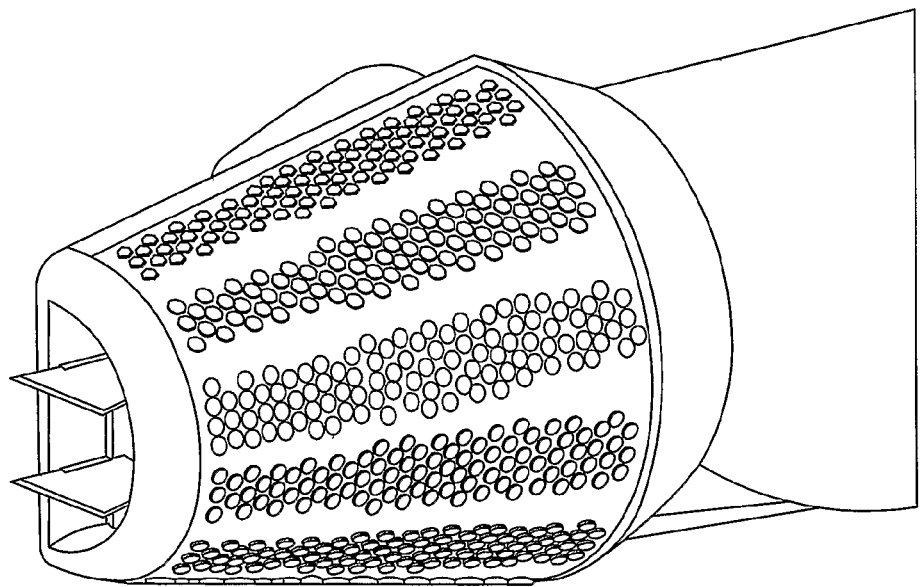
FIG. 2 is an example of a currently available EAPS.
Figure 3:
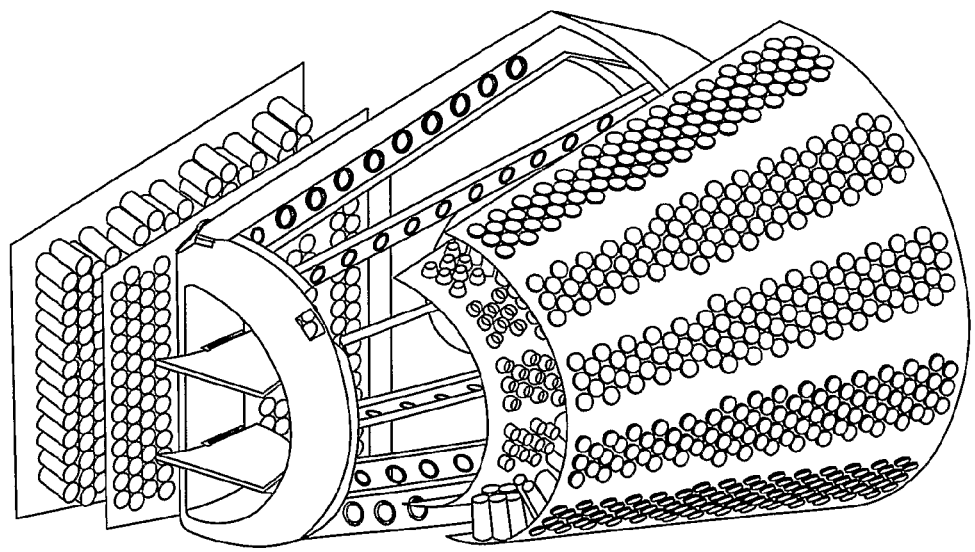
FIG. 3 is an exploded view of the EAPS of FIG. 2.

Referring to the drawings and in particular to FIG. 1, an exemplary non-limiting embodiment of an engine air particle filter system 10 in relation to an engine 14 such as a gas turbine engine on a rotary-wing aircraft 12 is shown.

Although engine air particle filter system 10 is shown in accordance with helicopter 12, it should be recognized that engine air particle filter system 10 can be used in combination with various engines and various vehicles, for example, an airplane or a ground vehicle.

Advantageously, system 10 allows for rapidly switching between various types of filter media in order to effectively filter air in a variety of environmental conditions.

Figure 4:
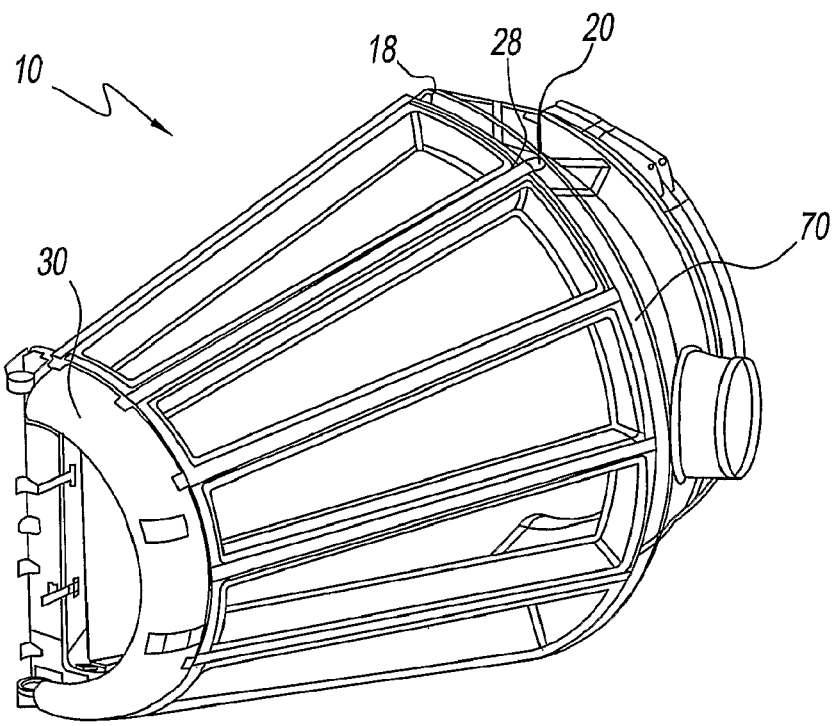
FIG. 4 is a top side perspective view of a first non-limiting embodiment of an engine air particle filter system shown in FIG. 1.
Figure 5:
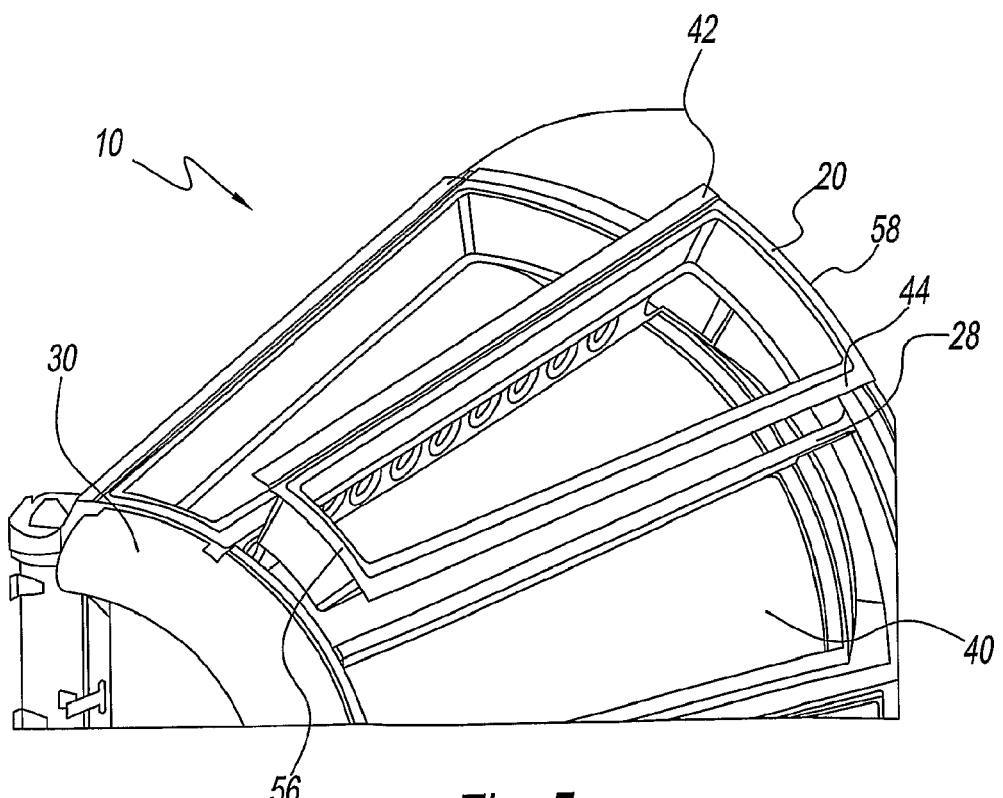
FIG. 5 is a partially exploded top perspective view of the engine air particle filter system shown in FIG. 4.
Figure 6:
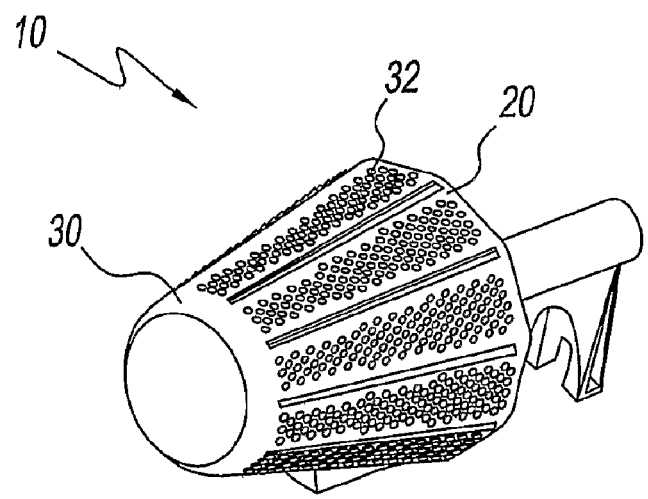
FIG. 6 is a side perspective view of a second non-limiting embodiment of an engine air particle filter system shown in FIG. 1, utilizing vortex tubes.
Figure 7:
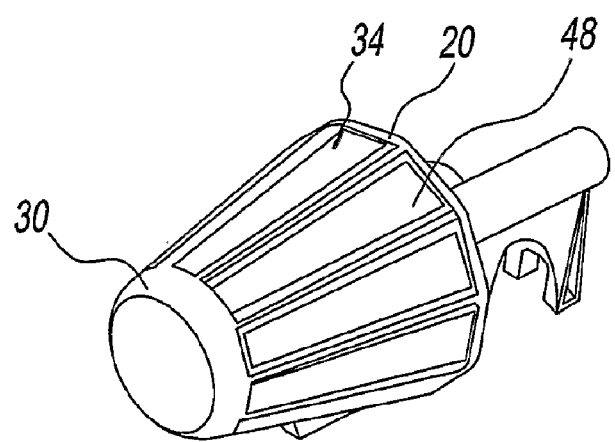
FIG. 7 is a side perspective view of a second non-limiting embodiment of an engine air particle filter system shown in FIG. 1, utilizing barrier filters.

As illustrated in FIGS. 4 and 5, engine air particle filter system 10 includes a support structure 18. Support structure 18 includes a plurality of ribs 28. Two adjacent ribs and two parts of support structure 18 define an opening 40. Although FIG. 4 shows engine air particle filter system 10 having six ribs and five openings 40, it is foreseen that engine air particle filter system 10 according to the present disclosure can have any number of ribs and openings deemed suitable. Furthermore, as seen in FIG. 4, support structure 18 forms an approximately semicircular shape. It is foreseen, however, that support structure 18 can have any suitable shape, including, but not limited to a roughly circular shape as shown in FIGS. 6 and 7. In a non-limiting embodiment, support structure 18 and each of the plurality of ribs 28 are made of a material sufficient to withstand the stress and heat associated with rotary-wing aircraft 12. For example, it is contemplated by the present disclosure that support structure 18 and each one of the plurality of ribs 28 may be made of steel, aluminum, a composite, and any combinations thereof.

As illustrated in FIGS. 4 through 7, engine air particle filter system 10 also has a front end 30. Front end 30 may be configured in any shape that is desired in that it forms an airtight connection with support structure 18. In a non-limiting embodiment, front end 30 is made of a material sufficient to withstand the stress and heat associated with rotary-wing aircraft 12. For example, it is contemplated by the present disclosure that front end 30 may be made of steel, aluminum, a composite, and any combinations thereof.

Engine air particle filter system 10 also contains a plurality of trays 20 corresponding in number to the number of openings 40. It is foreseen that tray 20 contains a filter media. The filter media can be of any type suitable for effectively filtering and removing impurities from the air. In a non-limiting embodiment, the filter media may be barrier filter panels 34 (FIG. 7) or vortex tubes 32 (FIG. 6).

As illustrated in FIGS. 6 and 7, tray 20 has a roughly rectangular shape although it is contemplated that tray 20 can have any shape suitable for fitting into opening 40. In addition, tray 20 has a roughly flat top surface 48. However, it is foreseen that top surface 48 may be curved. Tray 20 has a left lateral side trim 42 that is elevated in relation to top surface 48 of tray 20 and a right lateral side trim 44 that is flat with respect to top surface 48 of tray 20. Tray 20 also has a front trim 56 and back trim 58. In a non-limiting embodiment, the right and left lateral side trims 42 and 44 and front and back trims 56 and 58 are made of any material deemed suitable to withstand the stress and heat associated with rotary-wing aircraft 12 while forming integral edge seal 46. Integral edge seal 46 is an airtight connection between the right and left lateral side trims 42 and 44, rib 28, and support structure 18. For example, it is contemplated by the present disclosure that right and left lateral side trims may be made of steel, aluminum, composite plastic, plastic compositions, rubber, rubber compositions, and any combination thereof. In addition, in one non-limiting embodiment each of trays 20 have the same size and shape.

Figure 8:
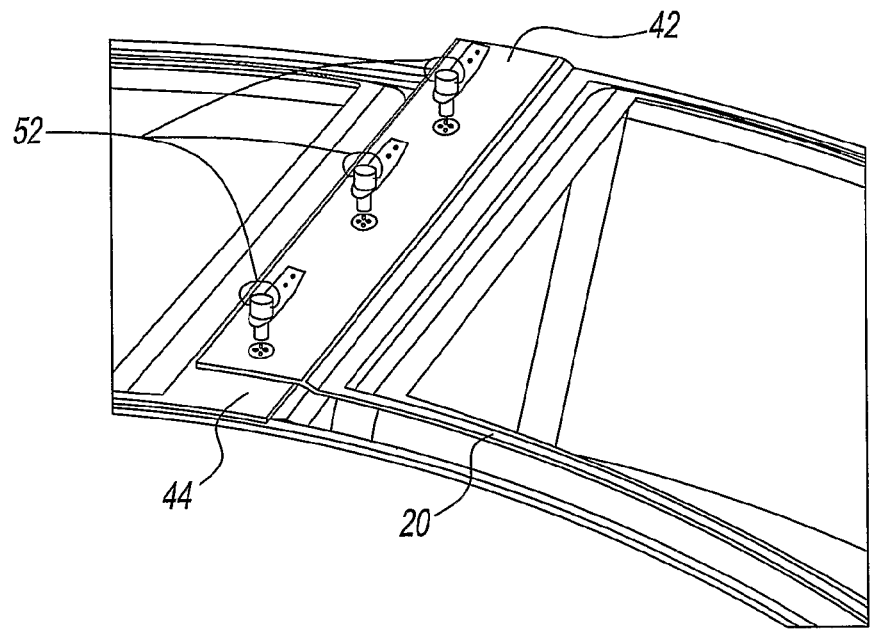
FIG. 8 is a partially exploded top perspective view of the engine air particle filter system shown in FIGS. 6 and 7.

Furthermore, engine air particle filter system 10 includes one or more connectors 52. As illustrated in FIG. 8, connector 52 may be of any type that allows tray 20 to be releasably secured to support structure 18 while also forming an airtight connection between tray 20 and support structure 18. In one non-limiting embodiment, connector 52 includes a quick-turn fasteners along the longitudinal center axis of left lateral side trim 42. Right lateral side trim 44 of adjacent tray 20 has a plurality of holes that correspond to the plurality of quarter-turn fasteners on left lateral side trim 42 in adjacent tray 20. In addition, support structure 18 has a plurality of quick-turn retainers corresponding in location to both the quarter-turn fasteners on left lateral side trim 42 and the plurality of holes on right lateral side trim 44. It is foreseen that other connectors may include, but not be limited to, any other type of suitable hardware.

Trays 20 nest within support structure 18. Both left and right lateral side trims 42, 44 of an individual tray 20 are supported by longitudinal ribs 28. Front trim 56 of tray 20 rests on front end 30 and rear trim 58 rests on mid-frame support 70 within support structure 18. All underside surfaces of left lateral side trim 42 and right lateral side trim 44 of tray 20 are coated with sealing material such as bonded-on strips of rubber material. Integral quarter-turn fasteners clamp tray edges along each lateral side trim to support structure 18. Additionally, the bottom of tray 20 has insert indexes on support structure 18 that provide consistent alignment and internal sealing.

Figure 9:
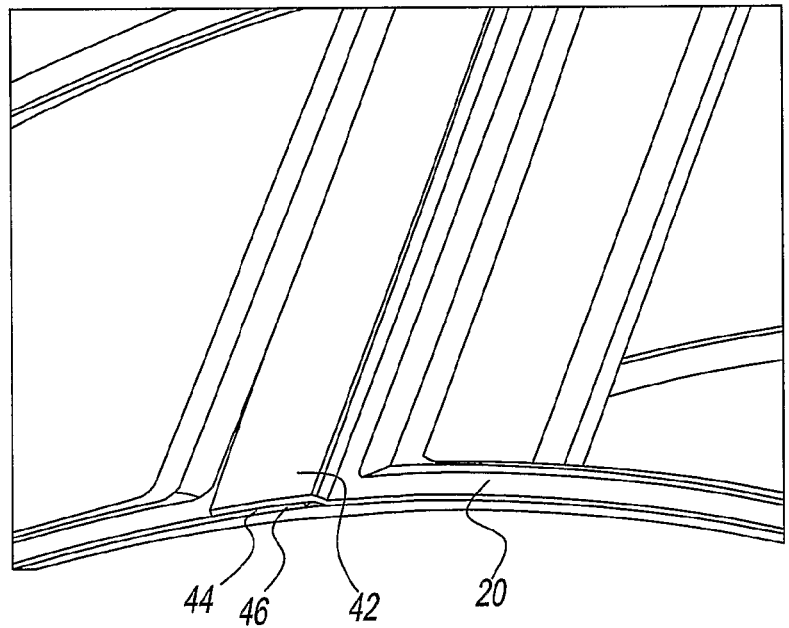
FIG. 9 is a partially assembled view of the engine air particle filter system shown in FIG. 8.

In one non-limiting embodiment, as seen in FIGS. 5, 8, and 9, during assembly of engine air particle filter system 10, each of a plurality of trays 20 are identically constructed wherein each tray 20 has a left lateral side trim 42 having a plurality of quarter-turn fasteners aligned along a longitudinal center axis of the left lateral side trim. Each tray 20 also has right lateral side trim 44 that has a series of holes corresponding in location and alignment to the series of quarter-turn fasteners on left lateral side trim 42. In addition, support structure 18 has a plurality of quarter-turn retainers corresponding to the series of holes in right lateral side trim 44 and the series of quarter-turn fasteners on left lateral side trim 42. A first tray 20 is placed into a corresponding opening 40. Left lateral side trim 44 of first tray 20 rests on and is secured to a raised edge surface on support structure 18 by any means sufficient to form a connection between the left lateral side trim and the raised edge surface of the support structure. A second tray is then positioned so that the series of quarter-turn fasteners on left lateral side trim 44 of the second tray is inserted through the series of holes in right lateral side trim 44 of the first tray and into the corresponding quarter-turn retainer on support structure 18. A quarter-turn in a clockwise direction of the quarter-turn fastener will secure each of the first and second trays 20 to support structure 18 in an airtight fashion forming integral edge seal 46 between the first and second trays. Each additional adjacent tray will then be added sequentially in a similar fashion until each of openings 40 are filled with trays 20. When last tray 20 is added, right lateral side trim 44 will be secured to support structure 18 by any means sufficient to secure right lateral side trim 44 to support structure 18 in an air-tight fashion. For example, a strip of metal with a series of quarter-turn fasteners corresponding to the series of holes in right lateral side trim 44 of the last tray could be used to secure last tray 20 to support structure 18 in an airtight connection.

Integral edge seals 46 form airtight connections between each of trays 20 preventing air from escaping through any spaces in engine air particle filter system 10. Additionally, when tray 20 is secured to support structure 18, an airtight connection is formed between front trim 56 and support structure 18. Similarly, an airtight connection is also formed between back trim 58 and support structure 18.

Figure 10:
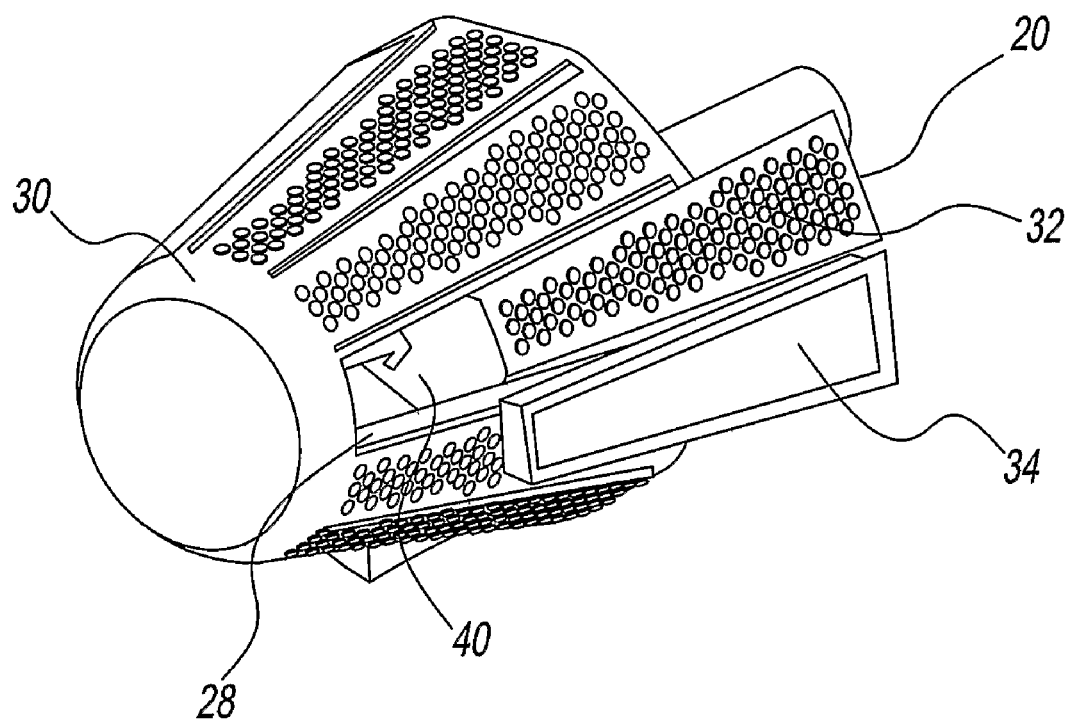
FIG. 10 is a partially exploded side perspective view of the engine air particle filter system shown in FIGS. 6 and 7.

In another non-limiting embodiment, and as illustrated in FIG. 10, each of identical trays 20 slide into each of the plurality of openings 40 in a sequential manner until each one of openings 40 has been filled with a corresponding tray 20. Each of the trays 20 will then be secured to support structure 18 as discussed above. The right lateral side trim 44 of the last tray added will be secured to support structure by any means suitable to form an airtight connection between right lateral side trim 44 and support structure. For example, a strip of metal having a plurality of quarter-turn fasteners that correspond and location to each of the holes of right lateral side trim 44 may be used as discussed above. In other non-limiting embodiments, it is foreseen that screws or bolts may be used for a more permanent attachment of last tray 20 to support structure 18.

Once system 10 is assembled, support structure 18 is attached to rotary-wing aircraft 12 in any manner deemed appropriate. For example, in one method, the forward most portion of the EAPS barrel is attached to the aircraft via an aircraft mounted tubular support structure known as the "J-bar". The EAPS barrel hinges on this tube and acts much like a door. At the rear, an airframe mounted ring provides a fixed landing for the EAPS barrel mounted retaining latches to attach.

Operation of engine air particle filter system 10 according to one non-limiting embodiment of the present invention will now be described with reference to FIGS. 1, 6 and 7.

As shown in FIG. 1, engine air particle filter system 10 is positioned in front of internal combustion engine 14. There are airtight connections between each part of engine air particle filter system 10 so that air laden with impurities flows through the filter media of each one of trays 20. The amount of air that flows through the filter media depends on the size and shape of each tray 20 and its orientation in relation to the air path.

In a first non-limiting embodiment, when tray 20 contains barrier filter panels 34, the impurities from the air collect on the surface of the filter panels and the filtered air flows through the filter media and into engine air particle filter system 10. The air then flows through a tube and into an inlet in internal combustion engine 12. During servicing, each tray 20 can be quickly detached from support system 18 by disconnecting connector 52 and removing tray 20. The barrier filter panels 34 can then be cleaned wherein the impurities that have collected on panels 34 can be removed. As an alternative, a replacement tray 20 containing filter media can be inserted into opening 40 and quickly secured into place as discussed previously.

In another non-limiting embodiment, tray 20 will contain vortex tubes 32 as the filter media. During use, air that is laden with impurities will flow through the vortex tubes wherein the impurities will be removed from the air. Clean air will then enter the engine through an inlet. The dirty air, on the other hand, is discharged overboard through a scavenge system powered by an electric blower (not shown). During servicing, each tray 20 can be quickly removed from support system 18 whereupon the trays and filter media can be cleaned or alternatively a replacement tray 20 can be reinserted into opening 40 and secured to support system 18 as discussed previously.

In a non-limiting embodiment, each one of the plurality of trays 20 will have the same type of filter media. However, it is foreseen that in some non-limiting embodiments, trays 20 containing differing filter medias may be used. Additionally, it is also contemplated that during servicing of engine air particle filter system 10, tray 20 containing one type of filter media, e.g. vortex tubes 32, will be replaced by another tray 20 containing a different type of filter media, e.g. barrier filter panels 34, or vice versa.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary non-limiting embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular non-limiting embodiment(s) disclosed as the best mode contemplated, but that the disclosure will include all non-limiting embodiments falling within the scope of the appended claims.

What is claimed is:

1. An engine air particle filter system for a rotary-wing aircraft, comprising:
    a support structure;
    a plurality of trays each of which support an air filtering media, wherein at least one of said plurality of trays fit into said support structure to at least partially overlap an adjacent one of said plurality of trays in an airtight configuration; and
    a plurality of connectors to releasably secure said plurality of trays to said support structure.

2. The engine air particle system of claim 1, wherein said air filtering media comprises vortex tubes.

3. The engine air particle system of claim 1, wherein said air filtering media comprises barrier filters.

4. The engine air particle system of claim 1, wherein said support structure is cylindrical in shape.

5. The engine air particle system of claim 1, wherein said support structure is semi-circular in shape.

6. The engine air particle system of claim 1, wherein each one of said plurality of trays has a top surface that is flat.

7. The engine air particle system of claim 1, wherein each one of said plurality of trays has a top surface that is curved.

8. The engine air particle system of claim 1, wherein each of said plurality of trays mount to said support structure in a sequential manner.

9. A method of converting from a first type of air filtering media to a second type of air filtering media in an engine air particle filter system, comprising:
    releasing a plurality of connectors that releasably secure a first plurality of adjacent trays to a support structure of the engine air particle filter system, wherein at least one of said first plurality of adjacent trays contains the first type of air filtering media;
    removing said first plurality of adjacent trays from said support structure in a first sequence;
    inserting a second plurality of adjacent trays into said support structure in a sequence reverse to said first sequence, wherein at least one of said second plurality of adjacent trays contains the second type of air filtering media; and
    engaging said plurality of connectors so that said plurality of connectors releasably secure said second plurality of trays to said support structure wherein at least one of said plurality of trays at least partially overlap an adjacent one of said plurality of trays in an airtight configuration.

10. The method according to claim 9, wherein said inserting step further comprises sliding each one of said second plurality of trays into an opening in said support structure.

11. The method according to claim 9, wherein said inserting step further comprises placing each one of said second plurality of trays into an opening in said support structure.

12. The method of claim 9, wherein each of said first plurality of trays and each of said second plurality of trays has a first lateral side trim with a plurality of fasteners and a second lateral side trim that has a series of holes which correspond in location and alignment to said plurality of fasteners on said first lateral side trim.

13. An engine air particle filter system for a rotary-wing aircraft, comprising:
a support structure that defines a multiple of adjacent openings, each of said multiple of adjacent openings configured to selectively receive a respective multiple of trays, said multiple of trays selected from a first multiple of trays which include a first type of air filtering media and a second multiple of trays which include a second type of air filtering media different than said first type of air filtering media wherein at least one of said multiple of trays at least partially overlap an adjacent one of said plurality of trays in an airtight configuration.

14. The system as recited in claim 13, further comprising a connector to releasably secure any of at least said first tray which supports said first type of air filtering media and said second tray which supports said second type of air filtering media different than said first type of air filtering media to said support structure.

15. The system as recited in claim 13, wherein each of said multiple of trays nest within said support structure to at least partially overlap an adjacent one of said multiple of trays in an airtight configuration.

16. The system as recited in claim 13, wherein said support structure forms a generally frustro-conical structure.

17. The system as recited in claim 13, wherein said engine is a gas turbine engine.

18. The system as recited in claim 17, wherein said support structure is positioned forward of an engine.

19. The system as recited in claim 13, wherein said support structure is mounted to an outer periphery of a rotary wing aircraft.

20. The system as recited in claim 13, wherein said first type of air filtering media comprises vortex tubes and said second type of air filtering media comprises a barrier filter.

21. The engine air particle system of claim 1, wherein said plurality of trays are selected from a first plurality of trays and a second plurality of trays, said first plurality of trays support a first type of air filtering media, and said second plurality of trays support a second type of air filtering media different than said first type of air filtering media.

22. The engine air particle system of claim 21, wherein said first type of air filtering media comprises vortex tubes and said second type of air filtering media comprises a barrier filter.

23. The engine air particle system of claim 1, wherein each of said plurality of trays has a first lateral side trim with a plurality of fasteners and a second lateral side trim that has a series of holes which correspond in location and alignment to said plurality of fasteners on said first lateral side trim.

24. The engine air particle system of claim 23, wherein said plurality of fasteners are quarter-turn fasteners.

25. The engine air particle system of claim 1, wherein each one of said plurality of trays slides into said support structure.

26. The engine air particle system of claim 1, wherein each one of said plurality of trays fit into said support structure between a first rib of said support structure and a second rib of said support structure said second rib displaced from said first rib.

* * * * *